United States Patent [19]

Wagner

[11] Patent Number: 4,770,432

[45] Date of Patent: Sep. 13, 1988

[54] WHEELCHAIR

[75] Inventor: Kenneth E. Wagner, Chesterland, Ohio

[73] Assignee: Iatrics, Fenton, Mich.

[21] Appl. No.: 897,174

[22] Filed: Aug. 15, 1986

[51] Int. Cl.[4] .............................................. B62B 11/00

[52] U.S. Cl. ............................ 280/242 WC; 280/647; 280/650; 297/DIG. 4; 301/63 PW

[58] Field of Search ........... 280/242 WC, 47.38, 47.4, 280/642, 644, 647, 650; 301/63 PW, 63 C; 297/DIG. 4

[56] References Cited

U.S. PATENT DOCUMENTS

| | | | |
|---|---|---|---|
| 4,026,568 | 5/1977 | Hallam | 280/647 |
| 4,101,143 | 7/1978 | Sieber | 280/647 |
| 4,280,736 | 7/1981 | Raudman | 301/63 PW |
| 4,598,921 | 7/1986 | Fenwick | 280/242 WC |
| 4,625,984 | 12/1986 | Kitrell | 280/242 WC |

*Primary Examiner*—John J. Love
*Assistant Examiner*—Donn McGiehan
*Attorney, Agent, or Firm*—Cullen, Sloman, Cantor, Grauer, Scott & Rutherford

[57] ABSTRACT

A wheelchair construction particularly adaptable for collapsible wheelchairs and which may be formed of all nonmagnetic material, wherein the major components are skinned polymeric foam wheels and panels. The seat and back panels are hingedly supported on side panels, wherein the back panels include a downwardly opening V-shaped channel adjacent the center hinge which receives the upwardly foldable seat panels as the wheelchair is collapsed and the seat panels are supported in an overcenter hinge position on transverse foldable panels. The side panels include openings at their upper rearward corners forming integral C-shaped handles and the footrests are supported in a horizontal use or angled non-use position in configured slots formed in a support block.

18 Claims, 3 Drawing Sheets

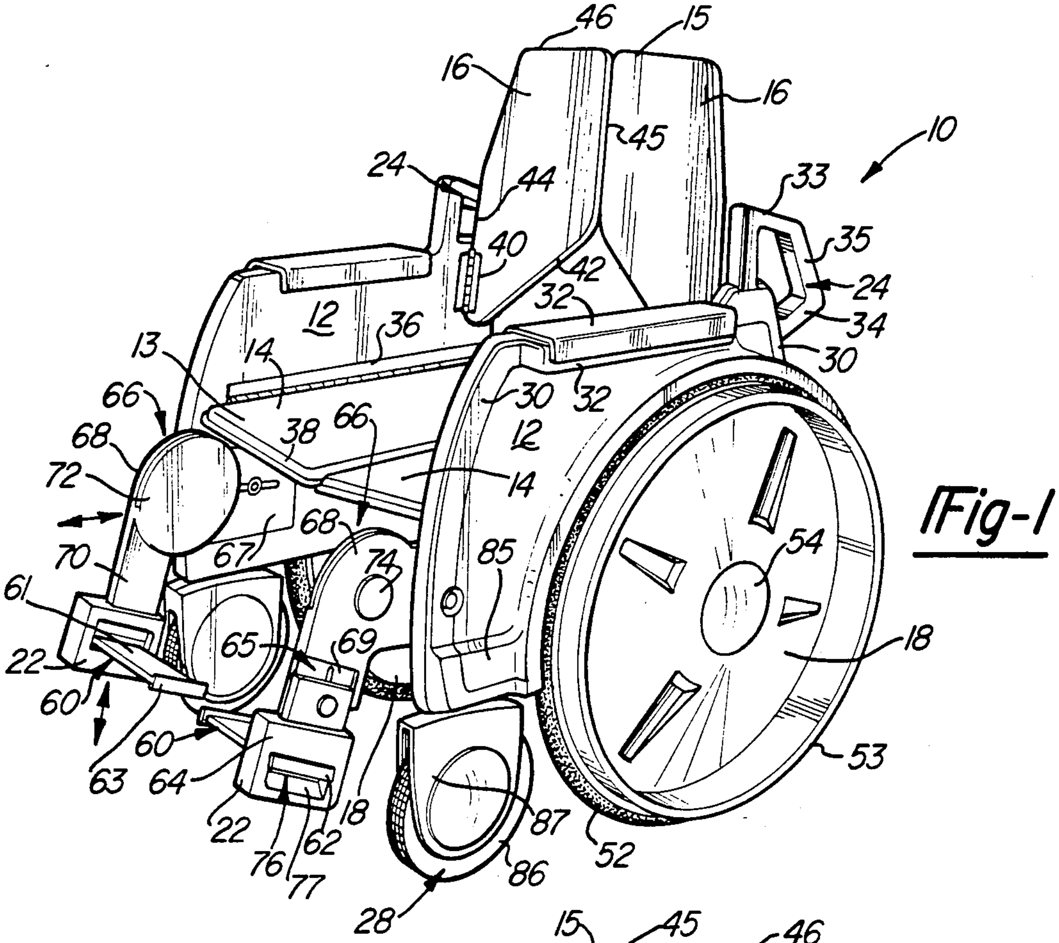
IFig-1
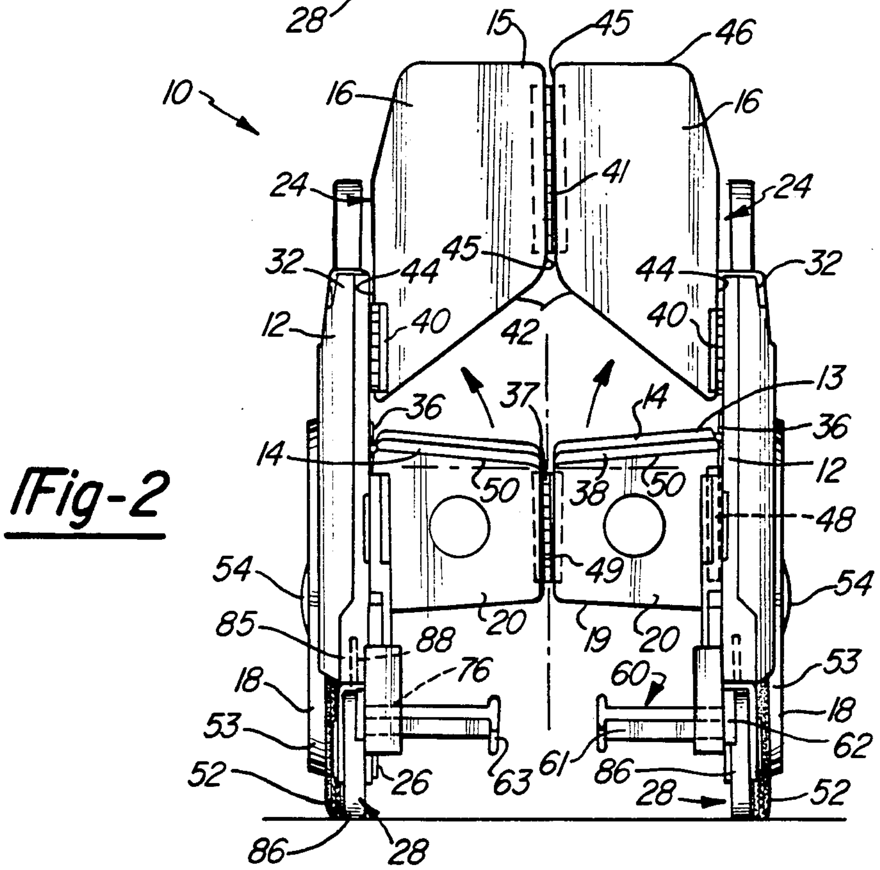
IFig-2

WHEELCHAIR

FIELD OF INVENTION AND DESCRIPTION OF THE PRIOR ART

The wheelchair of this invention is particularly, although not exclusively, adapted for collapsible wheelchairs, including applications requiring the use of nonmagnetic materials and wherein the major components are formed of cast polymeric foam.

At present, the major structural components of most wheelchairs are bent metal tubes, although plastic is now being used for seating and lumbar support. Foldable wheelchairs are generally not sufficiently rugged for everyday use and wheelchairs are generally heavy and unattractive in appearance. In applications where the wheelchair must be formed of nonmagnetic materials, such as in Magnetic Resonance Imaging or MRI, nonmagnetic stainless steel is substituted for the steel tubing, substantially increasing the cost and weight of the wheelchair.

The result has been that plastic is being substituted for certain components of wheelchairs, however, there has been no major redesign of wheelchairs taking full advantage plastic structural components. For example, U.S. Pat. No. 4,457,535 to Takeuchi et al. discloses a wheelchair which may be formed primarily of plastic tubing and flexible material webs. U.S. Pat. No. 4,268,054 to Twitchell et al. discloses a wheelchair having molded plastic components, including a one-piece contoured plastic seat.

The prior art includes numerous examples of collapsible or foldable wheelchairs. One example of a foldable wheelchair is disclosed in U.S. Pat. No. 4,101,143 to Sieber which discloses a foldable wheelchair having a plastic frame. However, the wheelchair disclosed in Sieber is not nonmagnetic because several of the components are metal including the wheels and the construction does not appear to be rugged enough for everyday use. Reference is also made to U.S. Pat. No. 4,026,568 to Hallam which discloses a foldable wheelchair, wherein the seat is composed of foldable hinged panels which are supported by transverse hinged panels which fold as the wheelchair is collapsed. It should be noted, however, that the primary structural elements are bent tubes and the seat panels are covered with a foam panel. Further, the construction does not appear to be rugged enough for everyday use and the construction is not nonmagnetic.

There is a need for a simple, rugged, foldable or collapsible wheelchair which takes advantage of the advances in plastic and nonmagnetic structural components. The wheelchair of this invention solves these problems and provides a rugged wheelchair construction which may be collapsible and utilized in applications which require a fully nonmagnetic wheelchair.

SUMMARY OF THE INVENTION

As described, the wheelchair of this invention is particularly although not exclusively, adapted for collapsible wheelchairs which may be formed of nonmagnetic materials. The major components, including the wheels, seat, side panels and lumbar support, may be formed of skinned polymeric foam, such as cast polyurethane foam. In the preferred collapsible wheelchair construction, the seat and back panels are hingedly supported on side panels. The wheelchair of this invention is rugged enough for everyday use and weighs approximately half as much as a standard wheelchair.

The collapsible wheelchair of this invention includes a pair of spaced side members or panels arranged in generally parallel vertical relation. The wheels, which may also be formed of skinned polymeric foam, are rotatably connected to the side panels and support the wheelchair. The seat comprises a pair of seat panels which are hingedly attached to the side panels and interconnected by a center hinge. The seat panels fold upwardly when the chair is collapsed. In the most preferred embodiment, the back of the wheelchair which provides lumbar support is formed of a pair of panels which are hingedly attached to the side panels and interconnected by a center hinge. In the most preferred embodiment, the back support panels are hingedly attached to the side panels adjacent their lower side edges and the inner side edges are angled upwardly toward the center hinge to define a generally V-shaped space between the back support panels which opens downwardly and receives the upwardly folding seat panels as the wheelchair is collapsed.

The construction further includes a pair of seat-supporting panels located below the seat panels which are also hingedly attached to the side panels and are interconnected by a center hinge. The seat-supporting panels are arranged generally perpendicular to the hinge axis of the seat panels when the wheelchair is unfolded. The top surfaces of the seat support panels are preferably inclined downwardly toward the center hinge whereby the seat panel center hinge is supported in an overcenter locked position. Similarly, the center hinge of the back and seat support panels are locked in an overcenter position resulting in a fully locked rugged construction which is particularly important where hingedly connected polymeric foam panels are used. As will be understood, the hinge axes of the seat panels are perpendicular to the hinge axes of the back and seat-supporting panels resulting in a secure foldable wheelchair. Locking the hinges are locked in an overcenter position assures that the chair will not inadvertently collapse.

Use of plastic or polymeric foam panels permits several other improvements in the wheelchair of this invention. For example, the preferred embodiment of the wheelchair of this invention includes integrally molded handles. The side panels each include a configured opening adjacent the top rearward corner of the panels defining an integral handle for controlling and steering the wheelchair. In the most preferred embodiment, the handles are generally C-shaped including an upper linear gripping portion, a rearward linear gripping portion and a lower gripping portion to accommodate gripping by persons of different heights and from different positions. The upper and lower linear gripping portions are inclined downwardly and the rearward linear gripping portion are inclined rearwardly providing a secure grip in almost any circumstance.

The footrests have also been redesigned to take advantage of the materials. In the preferred embodiment, the foot support members include support blocks having configured openings or slots to support the footrests in either a horizontal use position or in an angled non-use position which is out of the way of the patient and the operator of the wheelchair. In the disclosed embodiment, the top surfaces of the slots adjacent the outer surfaces of the support blocks and the bottom surfaces of the slots adjacent the inner surfaces of the blocks are generally horizontal and parallel to support the footrests in a generally horizontal position between the support blocks. Further, the bottom surfaces of the slots adjacent the outer surfaces of the support blocks are angled downwardly and the top surfaces of the slots adjacent the inner surfaces of the support blocks are angled upwardly in parallel relation to support the footrest in a downwardly angled position when the footrests are not in use. Thus, the footrests may be easily adjusted for use or pushed out of the way when the wheelchair is collapsed and not in use. Further, the outer ends of the footrest may be weighted to normally retain the footrest in the angled position when not in use.

As will be understood, the wheelchair of this invention thus takes advantage of the advances in nonmagnetic structural materials, particularly polymeric foam. The preferred polymeric foam has a tough external skin, such as cast polyurethane foam. The wheels are disc-shaped and preferably include a channel-shaped outer annular rim which receives a resilient elastomeric annular tire, such as a polyvinylchloride extrusion or synthetic rubber. The use of skinned polymeric foam for the major components of the wheelchair of this invention results in a modern, attractive appearance and the panels may be painted any color to provide a pleasing, unique appearance, which is particularly suitable for children. Further, an adult-sized wheelchair of this invention will weight only twenty to twenty-five pounds, which is less than half the weight of a conventional wheelchair. Further, as described, the wheelchair of this invention is rugged enough for everyday use.

Other advantages and meritorious features of the present invention will be understood from the following description of the preferred embodiments, the appended claims, and the drawings, a brief description of which follows.

BRIEF DESCRIPTION OF THE DRAWINGS

FIG. 1 is a perspective view of a foldable wheelchair of the present invention.

FIG. 2 is a front elevational view of the foldable wheelchair of the present invention.

DETAILED DESCRIPTION OF THE INVENTION

Figure 3:
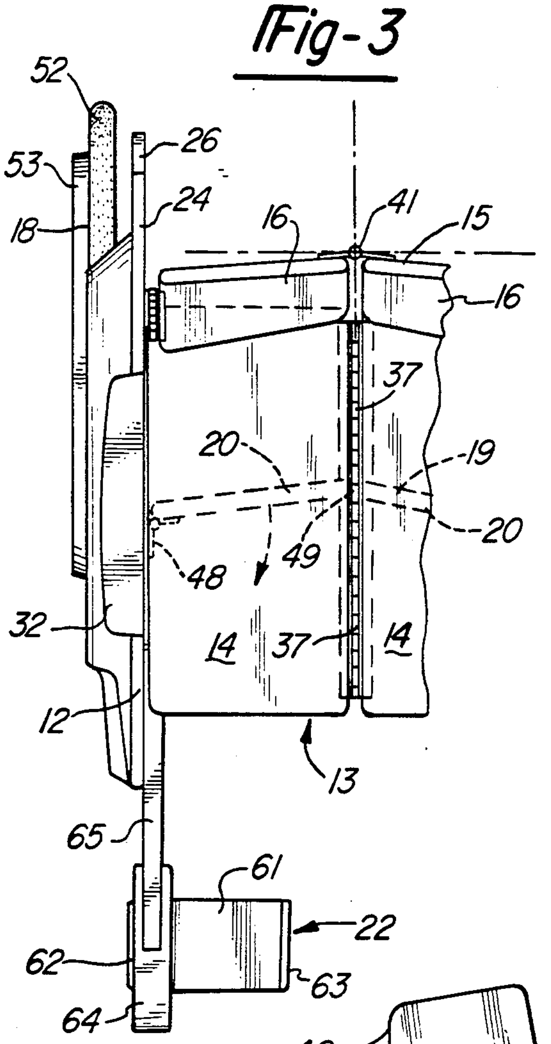
FIG. 3 is a fragmentary plan view of the foldable wheelchair of the present invention.

Referring to FIGS. 1 and 2, the foldable wheelchair 10 of the present invention is shown to include a pair of side panels 12 hingedly connected to a seat 13 comprising two hingedly connected seat panels 14. The side panels 12 are also hingedly interconnected by a back, or lumbar, support 15 which is formed by two hinged back support panels 16. A pair of wheels 18 are secured to respective side panels 12.

A seat support 19 extends between the side panels 12 and comprises two seat support panels 20 which are hingedly connected to each other and to the side panels 12. A pair of foot supports 22 are connected to the side panels 12 below the seat 13 and in front of the seat support 19. A pair of C-shaped handles 24 are integrally formed in the side panels 12 and extend rearwardly from the back support 15 on the rearward upper edge of the side panels 12. A pair of tilt-back guards 26 are preferably provided integrally upon the side panels 12 and extend slightly rearwardly and below the side panels 12 to prevent the wheelchair from tipping over backwards about the wheels 18. The front edge of the side panels 12 are adapted to received caster assemblies 28.

A unique aspect of the folding wheelchair of the present invention is that it is formed completely with materials that are nonmagnetic so that the wheelchair can be used in Magnetic Resonance Imaging (MRI). The major components of the wheelchair including the wheels, side panels, back, seat and seat support panels are formed of relatively rigid skinned polymeric foam materials. The preferred polymer is high density six pound polyurethane foam which is processed by water blowing and skinned in the casting process. Suitable foamable polyurethanes may be purchased from Pasto-O-Meric in Milwaukee, Wis. For example, the isocyanate polyether may be RF766 Resin using CO-B blowing agent and the polyol may include trichlorofluoromethane. As will be understood, other foamable polymers, preferably skinned foamable polyurethanes, may be used. The major panels are interconnected by aluminum piano-type hinges as will be described below. The wheel hubs, reinforcements, fasteners in the like are formed of nonmagnetic materials such as aluminum, stainless steel or brass. Currently, patients undergoing MRI scanning cannot be seated in a conventional wheelchair or even brought into the MRI room in a conventional wheelchair due to the fact that the MRI uses a 0.6 kilogauss magnet which can by its own force move the wheelchair.

The major body panels are rigid, but due to the water blowing process, has some surface softness which reduces the need for padding. The polyurethane foam is skinned to provide a smooth, impact-resistant surface. The fact that the back panels are rigid is important because they enable the wheelchair to provide lumbar support not previously provided in collapsible wheelchairs which generally include a cloth or fabric back.

Figure 6:
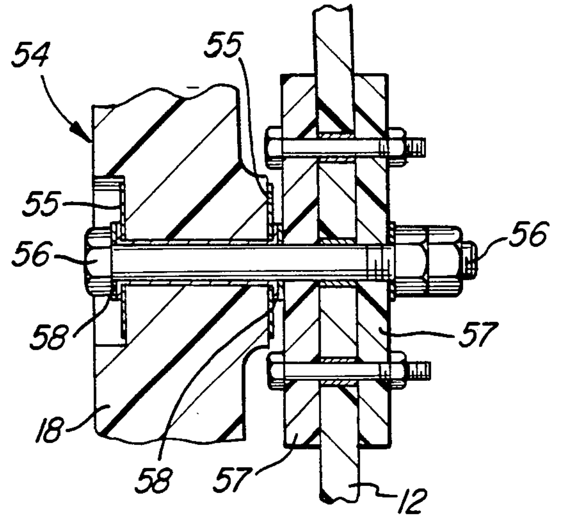
FIG. 6 is a fragmentary cross-sectional view taken along the line 6—6 in FIG. 5.

The side panels 12 are rimmed by reinforcing ridge about their periphery which provides strength at the edges of the panels. By reinforcing the edges the interior portions of the side panels 12 may be reduced in cross-section thereby saving weight and material. The upper edge of the side panels 12 is broadened to provide an arm rest 32. If desired, the arm rest 32 may be padded with a pad. The wheels 18 are mounted to the side panels 12 and about the center of the side panels. The center of the side panels 12 is preferably reinforced to ruggedly support the wheels 18 as shown in FIG. 6 and will be described in detail below.

Integrally molded handles 24, or handgrips, are formed when casting the side panels 12. The handles 24 are generally C-shaped with an upper gripping portion 33 which may be conveniently gripped by a tall person or a person standing on an elevated surface, such as a curb. A lower gripping portion 34 is formed on the bottom of the handles 24 which may be conveniently gripped by a short person or by a person standing on a lower surface, such as when the wheelchair is lifted into or out of a vehicle. A substantially vertical rearward portion 35 is provided for normal gripping. The upper portion is preferably angled slightly downwardly and the upper portion is angled slightly upwardly as shown in FIG. 1 for convenience in gripping the handles 24.

Figure 4:
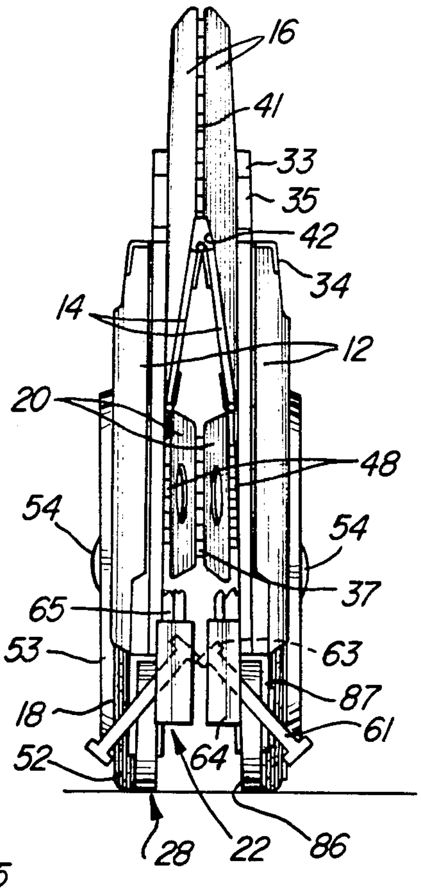
FIG. 4 is a front elevational view of the foldable wheelchair of the present invention in its folded condition.
Figure 5:
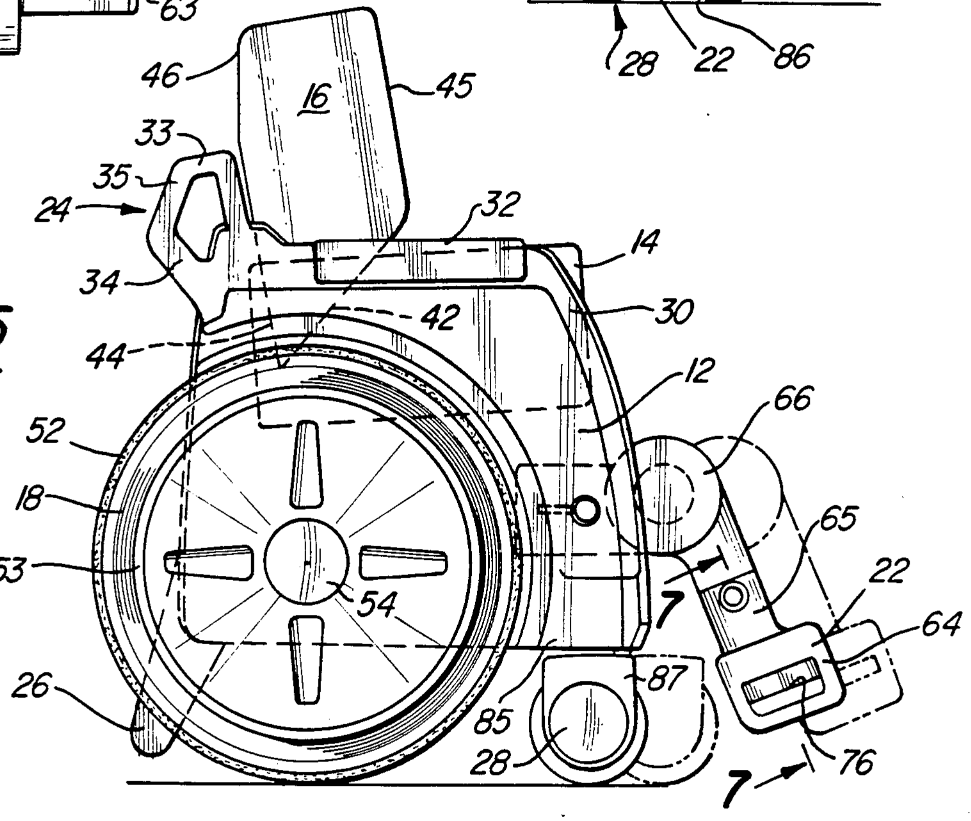
FIG. 5 is a side elevational view of the foldable wheelchair of the present invention in its folded condition.

The seat 13 is connected to the side panels 12 by side seat hinges 36. All of the hinges used in the foldable wheelchair are preferably elongated piano-type hinges. The side seat hinges extend the entire length of the outer edge of the seat panels 14 and are connected to permit the seat panels 14 to pivot or fold upwardly toward the side panels 12 when it is desired to fold the wheelchair. The inboard or center edges of the seat panels 14 are interconnected by a center seat hinge which extends the entire length of the inboard edges. The center seat hinge permits the seat panels 14 to pivot from a folded position, wherein the seat panels are substantially parallel to one another, as shown in FIG. 4, to an operational or open position as shown in FIG. 2, wherein the center seat hinge is in an overcenter condition wherein the seat panels 14 extend slightly downwardly toward the center seat hinge 37 from the side seat hinges 36. The importance of providing an overcenter condition is that the hinge rigidly supports the seat panels. The front edge 38 of the seat panels, as shown in FIGS. 1 and 2, includes a double radius which adds additional relief to the edge which is intended to contact the users legs.

The back support 15 extends between the two side panels 12. The back support panels 16 are connected on their outer edges to side back hinges 40. The side back hinges 40 interconnect the lower portion of the back support panels 16 to the upper rear edge of the side panels 12 in a generally vertical relationship. The two back support panels 16 on their inboard edge are connected to a center back hinge 41 which permits the back support panel 16 to fold inwardly over the seat 13 in its folded position and to an overcenter condition in its operative position to provide a rigid connection between the back support panels 16.

The bottom edge 42 of the back support panels 16 are tapered upwardly from the point of connection between the back support panels 16 and the side panels 12. The bottom edge 42 extends at an angle of approximately 45° relative to a line normal to the side panels 12. The angulation of the bottom edge 42 provides a V-shaped opening which permits the seat panels 14 to pivot upwardly as the back support panels 16 are pivoted inwardly, thereby permitting the wheelchair to have a rigid seat 13 and back support 15.

The lower outside edge 44 of the back support panels 16 are connected to the side back hinges 40. The upper inboard, or center, edge 45 of the back support panels 16 is connected to the center back hinge 41. The top of the side back hinges 40 are lower than the bottom of the center back hinge 41 and the side and center back hinges 40, 41 are generally parallel in the vertical direction.

The upper edge 46 of the back support panels 16 is generally L-shaped with a slight taper inwardly from the sides for aesthetic purposes.

The seat support 19 extends between the side panels 12 and the seat support panels 20 are in substantially parallel planes relative to the back support panels 16. The seat support panels 20 are connected to the side panels 12 by means of the side seat support hinges 48. The seat support panels 20 are generally trapezoidal in shape with the broadest edge of the parallel edges being disposed adjacent the side panels 12 and the shortest edge of the parallel trapezoid edges being adjacent one another and attached to the center seat support hinge 49. The upper edge 50 of the seat support panels 20 extend slightly downwardly from the side panels 12 to the center seat support hinge 49. This enables the seat panels 14 to rest upon the upper edge 50 in an overcenter position as previously noted. The seat support panels when folded extend forwardly from the side panels 12. When the seat support panels are deployed for use, the center seat support hinge is preferably positioned in an overcenter position to provide rigidity.

The wheels 18 of the wheelchair 10 are formed of cast polyurethane in one piece. The wheelchair features a solid tire 52 formed of an elastomeric material, such as polyvinylchloride or synthetic rubber, which is received upon a channel flange extending radially outwardly from the wheel. The tire is secured to the wheel by conventional means.

A push rim 53 is integrally molded with the wheel 18 which is adapted to be gripped by the user of the wheelchair. The wheels 18 include a hub 54 which will be described in detail in reference to FIG. 6. The hub 54 includes a pair of flange bearings 55 inserted from opposite sides of the wheel. A carriage bolt 56 is received through the flange bearings 55 and extends inboard of the wheels through the side panels 12 of the wheelchair 10. Each of the side panels 12 are reinforced by a pair of load plates 57. The load plates 57 are disposed on the inner and outer sides of the side panels 12 and are secured to the side panels by fasteners. Thrust washers 58 are preferably located on the carriage bolt 56 adjacent each of the flange bearings 55. The entire hub assembly 54 is formed of aluminum, stainless steel or other nonmagnetic metals. Specialized roller or ball bearings could be incorporated in the design of the wheelchair, however the solid bearings provided are simple, dependable and effective in a light weight wheelchair.

A unique aspect of the wheelchair 10 is the construction and operation of the foot supports 22. The foot supports 22 include two footrests 60 constructed from a plate 61, which may be formed of a cast polymer foam, having a side end flange 62 and a center T-shaped flange 63. Each of the footrests 60 is cantilevered from a support block 64 which is secured to the lower end of a leg portion 65.

The leg portion 65 includes a hub 66 that interconnects the leg portion 65 to a mounting flange 67. The mounting flange 67 is connected to the side panels 12 and is adjustably located relative to the side panels 12. The leg portion 65 includes a circular plate 68 which forms one half of the hub 66. The leg portion 65 is preferably formed in two parts to provide an extensible leg to accommodate users having different length legs. The leg portion 65 preferably includes a slotted arm 69 which is connected to the circular plate 68 and an extensible arm 70 which is connected on its lower end to the support block 64. The extensible arm 70 and slotted arm 69 are interconnected by a fastener 71 including a slot engaging nut and bolt permitting the extensible arm 70 to be connected to the slotted arm 69 in various relative positions.

The mounting flange 67 is connected to a mating circular plate 72 which forms the other half of the hub 66. The circular plates 68 and 72 preferably include complimentary interengaging buttons 73 which permit the circular plates to be rotated relative to each other and locked in place. Alternatively, a friction surface can be provided on the inner portions of the two circular plates 68 and 72. A pivot adjustment knob 74 is provided to lock the circular plates 68 and 72 together in the desired orientation. The pivot adjustment knob 74 is received through the circular plate 68 and in the threaded central opening of the mating circular plate 72. A nut is preferably press-fit into the central opening 75 to provide the threaded opening as is well known in the art.

The support block 64 includes a configured slot 76 extending laterally through the support block. The slot 76 includes a tip up relief area 77 which permits the footrest 60 to be tipped up and retracted from its extended, deployed position. The slot 76 supports the footrest in a cantilevered relationship by means of a top surface 78 which is adjacent the outboard or outer side of the support block 64 and a bottom surface 79 which is adjacent the inboard or inner side of the support block 64. The top surface 78 engages the top of the plate 61 and the bottom surface 79 engages the bottom of the plate 61. The side end flange 62 of the footrest 60 engages the outboard side of the support block 64 in the deployed position.

Figure 9:
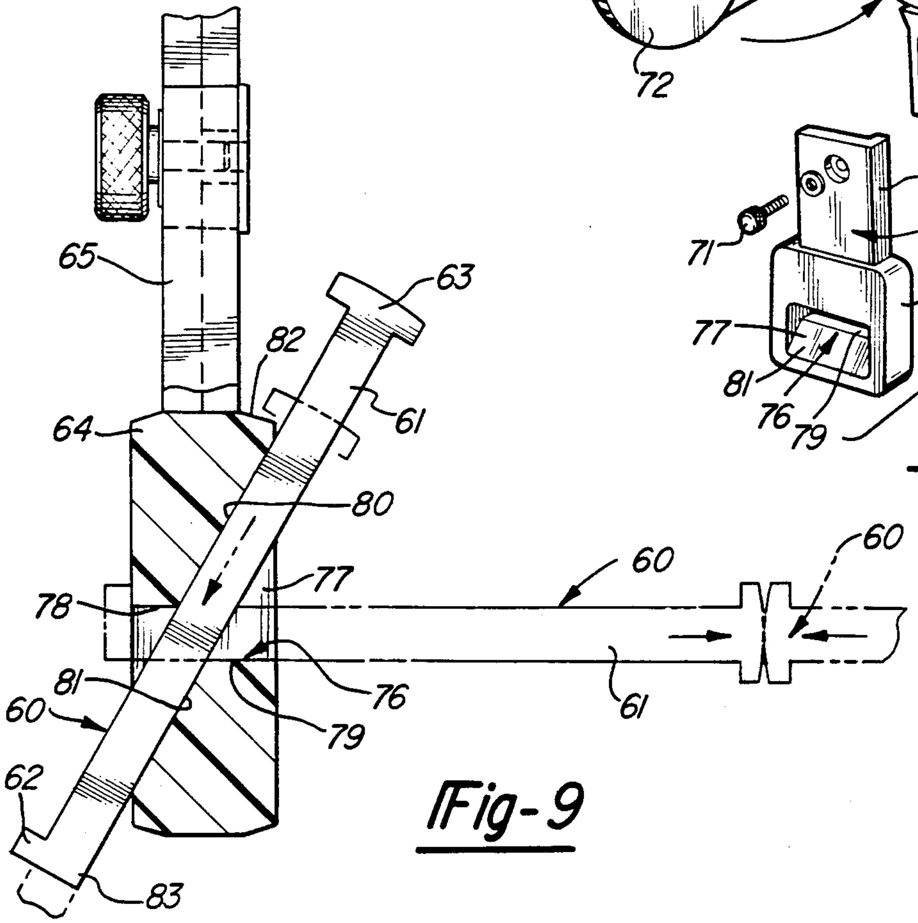
FIG. 9 is a fragmentary front elevational view of the footrest of the present invention.

As shown in FIG. 9, the tip up relief area 77 includes inwardly facing angled surface 80 which extends from the top surface 78 toward the upper end of the support block 64 and outwardly facing angled surface 81 which extends from the bottom surface 77 toward the lower end of the support block. The tip up relief 75 permits the footrest 62 be tipped upwardly and retract through the support block to extend downwardly below the support block and slightly outboard of the support block. The footrest 60 is retained in the slot in its retracted position by the engagement of the center T-shaped flange 63 with a shoulder 82 formed at the upper end of the support block 64. A weight 83 formed of brass, stainless steel or other nonmagnetic relatively heavy material is preferably provided on the footrest 60 adjacent the side end flange 62 to hold the footrest in its retracted position. The footrest may be simply deployed by pulling it inwardly and downwardly to a position perpendicular to the inner surface of the support block 64.

The footrests 60 automatically retracts upon folding the wheelchair provided that the two leg portions 65 are similarly positioned. If the two leg portions are positioned so that the center tee flanges 63 of the two foot supports 22 are an abutment shown in FIG. 9 collapsing the wheelchair will cause the two footrests 60 to be pushed outwardly. When the footrests pass the balance point, the weighted side end flange 62 will drop downwardly and slide along the inwardly and outwardly facing beveled surfaces 80 and 81.

Figure 7:
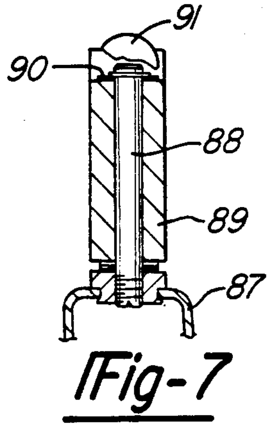
FIG. 7 is a fragmentary cross-sectional view taken along the line 7—7 in FIG. 5.
Figure 8:
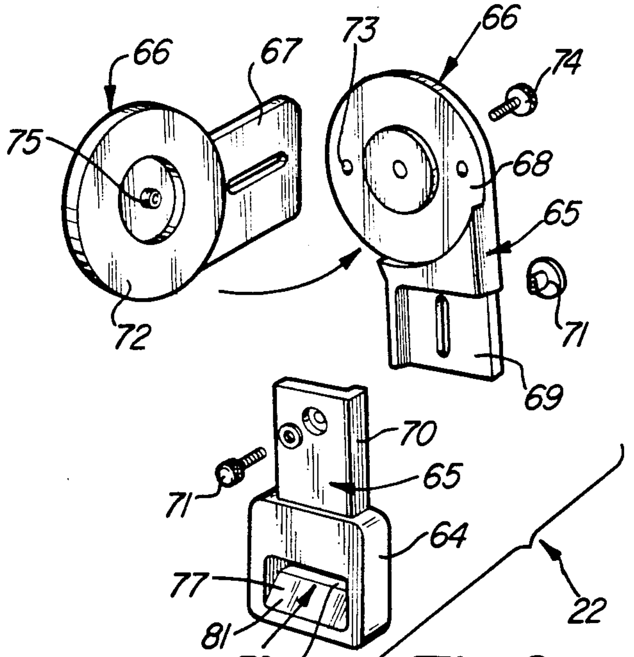
FIG. 8 is an exploded perspective view of the footrest assembly of the present invention.

Referring to FIG. 7 the side panels 12 each include means for receiving the caster assemblies 28. The caster assemblies 28 are received within an integrally formed caster support block 85 formed in the lower front portion of the side panels 12. The caster assemblies 28 include a wheel 86 which is retained in a yoke 87 on an axle as is known in the art. The yoke 87 is connected on its upper end to a swivel pin 88. The swivel pin 88 is mounted in a bushing preferably formed of nylon or another low friction material which permits easy turning of the swivel pin 88. The bushing 89 is retained within the caster support block 85. The swivel pin 88 is locked into the bushing 89 by means of a retaining snap ring 90. A cap 91 is preferably provided over the top of the snap ring 90 and the swivel pin 88. The caster assemblies 28 of the present invention are simply constructed and durable yet provide easily pivotable turning wheels for the wheelchair.

It should be appreciated that there has been provided in accordance with the present invention a preferred embodiment of the foldable wheelchair of the present invention. It is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. A collapsible wheelchair, comprising:

a pair of spaced side panels arranged in generally parallel vertical relation, wheels rotatably connected to said side panels supporting said wheelchair, a pair of seat panels, each seat panel having one side edge hingedly attached to one of said side panels extending generally perpendicular to said side panels and said seat panels interconnected by a center hinge means, said hinge means adapted to permit said seat panels to fold upwardly toward each other about said hinges to collapse said wheelchair, and a pair of back support panels, each back support panel having one side edge hingedly attached to one of said side panels with the hinge axes generally transverse to the side hinge axis of said seat panels, and said back support panels interconnected by a center hinge means, said back and support panel hinge means adapted to permit said back support panels to fold forwardly toward each other about said hinges as said wheelchair is collapsed, and said back support panels including a downwardly opening generally V-shaped opening adjacent said support panel center hinge axis which receives the top portions of said seat panels adjacent said seat panel center hinge axis as said wheelchair is collapsed.

2. The collapsible wheelchair defined in claim 1, wherein said wheelchair is nonmagnetic and wherein said side, seat and back support panels and said wheels are formed of a foamed polymer having a tough external skin.

3. The collapsible wheelchair defined in claim 1, wherein said wheelchair includes two seat supporting panels located below said seat panels, each seat supporting panel having a side edge hingedly attached to one of said side panels generally perpendicular to and adjacent the side hinge axis of the adjacent seat panel, said seat supporting panels interconnected by a center hinge means, whereby said seat support panels fold toward each other as said wheelchair is collapsed and the top surfaces of said seat support panels supporting said seat panels in the open position of said wheelchair.

4. The collapsible wheelchair defined in claim 3, wherein said seat support panel top surfaces are inclined downwardly toward said seat support panel center hinge means, whereby said seat support panel center hinge means is supported in an overcenter locked position, locking said seat panels before said seat panels in the generally horizontal position.

5. The collapsible wheelchair defined in claim 3, wherein said seat support panel center hinge means is adapted to permit said seat support panels to fold forwardly about the axes of said seat supporting panel side hinges.

6. The collapsible wheelchair defined in claim 3, wherein said center hinge means is adapted to permit said seat support panels to fold forwardly about the axes of said seat supporting panel side hinges and unfold rearwardly to an overcenter locked position, providing a rigid construction for said collapsible wheelchair in said open position.

7. The collapsible wheelchair defined in claim 1, further having foot support members comprising generally downwardly extending arm portions attached to said side panels, each arm portion having a generally horizontal slot adjacent its lower end, a plate-shaped footrest in each of said slots, said slots each having a top surface adjacent the outer surface of said member and a generally parallel bottom surface adjacent the inner surface of said member generally parallel to the axis of said wheels which support said footrest in generally parallel relation, and each of said slots further having an upwardly angled upper surface adjacent the inner surface of said member and a generally parallel downwardly angled lower surface adjacent the outer surface of said member supporting said footrest in a downwardly angled position.

8. The collapsible wheelchair defined in claim 1, wherein said side panels include integral generally C-shaped handles adjacent the upward rearward corners of said side panels.

9. A collapsible wheelchair, comprising:

a pair of side members arranged in spaced generally vertical relation, a pair of seat panels, each seat panel having one side edge hingedly attached to one of said side members and said seat panels interconnected by a hinge means at their adjacent side edges, said seat panel center hinge means adapted to permit said seat panels to fold upwardly to collapse said wheelchair, a pair of seat-supporting panels, each seat-supporting panel hingedly attached to one of said side members below and generally perpendicular to the hinge axis of said seat panels, and said seat panels interconnected by a center hinge means, said seat support panel center hinge means adapted to permit said seat support panels to fold toward each other as said wheelchair is collapsed, the top surfaces of said seat support panels located adjacent and immediately below said seat panels and said seat support panel top surfaces inclined downwardly toward said seat support panel center hinge means whereby said seat panel center hinge means is supported in an overcenter locked position, locking said seat panels in a generally horizontal position.

10. The collapsible wheelchair defined in claim 9, wherein said back support panels are hingedly attached to said side members adjacent their lower side edges, the inner side edges being angled upwardly toward said center hinge means defining a generally V-shaped space between said back support panels opening downwardly and receiving said seat panels as said wheelchair is collapsed.

11. The collapsible wheelchair defined in claim 9, wherein said side members are panels formed of skinned polymeric foam, disc-shaped wheels formed of a skinned polymeric foam rotatably connected to said side panels and supporting said wheelchair, and said seat, supporting and back support panels formed of a skinned polymeric foam resulting in a lightweight nonmagnetic wheelchair.

12. A wheelchair having spaced side members, wheels rotatably connected to said side members supporting said wheelchair, a seat supported between said side members and foot support members, said foot support members including a pair of opposed support blocks adjacent the lower forward end of said wheelchair, each of said support blocks having a slot opening therethrough and a generally plate-shaped footrest located in each of said slots, the top surfaces of said slots adjacent the outer surfaces of said support blocks and the bottom surfaces of said slots adjacent the inner surfaces of said support blocks being generally horizontal and parallel to support said footrest in a generally horizontal position between said support blocks, the bottom surfaces of said slots adjacent the outer surfaces of said support blocks being angled downwardly and the top surfaces of said slots adjacent the inner surfaces of said support blocks being angled upwardly to support the mid-portion of said footrest in a downwardly angled position when said footrests are not in use.

13. The wheelchair defined in claim 12, wherein said footrests include enlarged end portions preventing the footrest from being inadvertently removed from said slots.

14. The wheelchair defined in claim 13, wherein said outer ends of said footrests are weighted to normally retain said footrest in said angled position when not in use.

15. The wheelchair defined in claim 12, werein said foot support members each include a hub having a frictional surface and said wheelchair having mating hubs, a fastening means interconnecting said hubs in a desired angled position, and said foot support members each including an arm portion extending generally downwardly from said hub having said support blocks at their lower end.

16. A wheelchair having spaced generally vertical side panels, a seat member supported between said side panels, wheels supporting said side panels and said wheelchair, and foot support members, said foot support members including downwardly extending arm portions attached to said side panels, a block support located adjacent the end of said arm members having a generally horizontal slot, a plate-shaped footrest in each of said slots, said slots each including a top surface adjacent the outer surface of said support block and a generally parallel bottom surface adjacent the inner surface of said support block which supports said footrest in generally horizontal position, and each of said slots further including an upwardly angled top surface adjacent the inner surface of said support block and a generally parallel downwardly angled bottom surface adjacent the outer surface of said support block supporting said footrest in a downwardly angled position when not in use.

17. The nonmagnetic wheelchair defined in claim 16, wherein said side panels each include a configured opening adjacent the top rearward corner thereof defining an integral handle for controlling and steering said wheelchair.

18. The nonmagnetic wheelchair defined in claim 17, wherein said handles are generally C-shaped including an upper linear gripping portion, a rearward linear gripping portion and a lower linear gripping portion.

* * * * *